United States Patent
Eck et al.

(10) Patent No.: US 8,671,932 B2
(45) Date of Patent: Mar. 18, 2014

(54) METHOD OF OPERATING A SOLAR THERMAL POWER PLANT AND SOLAR THERMAL POWER PLANT

(75) Inventors: Markus Eck, Leonberg (DE); Tobias Hirsch, Stuttgart (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 996 days.

(21) Appl. No.: 12/288,166

(22) Filed: Oct. 15, 2008

(65) Prior Publication Data
US 2009/0101138 A1  Apr. 23, 2009

(30) Foreign Application Priority Data
Oct. 22, 2007 (DE) .......................... 10 2007 052 234

(51) Int. Cl.
  F24J 2/00 (2006.01)
  F24J 2/40 (2006.01)
  G05D 23/00 (2006.01)
  F03G 6/00 (2006.01)

(52) U.S. Cl.
  USPC ........... 126/714; 126/569; 126/572; 126/583; 126/585; 126/587; 700/299; 165/293; 165/294; 60/641.8; 60/641.9; 60/641.11; 60/641.13; 60/641.15

(58) Field of Classification Search
  USPC ......... 126/569, 572, 583, 585, 587, 714, 906; 700/299; 165/293, 294; 60/641.8, 60/641.9, 641.11, 641.13, 641.15
  See application file for complete search history.

(56) References Cited

U.S. PATENT DOCUMENTS

| 1,814,897 A | * | 7/1931 | Coxe .............................. 126/646 |
| 4,021,895 A | * | 5/1977 | Morse et al. ................... 126/640 |
| 4,103,674 A | * | 8/1978 | Robinson et al. ............. 126/641 |
| 4,129,118 A | * | 12/1978 | Banke ........................... 126/597 |

(Continued)

FOREIGN PATENT DOCUMENTS

| DE | 196 23 457 | 12/1997 |
| DE | 101 52 971 | 12/2002 |
| DE | 10 2007 005 562 | 8/2008 |
| JP | 10103605 A * | 4/1998 .............. F22B 35/00 |

OTHER PUBLICATIONS

Markus Eck, DE 10152971 Description Translation, Dec. 5, 2002, Espacenet Machine Translation, Description Pages.*

(Continued)

*Primary Examiner* — Kenneth Rinehart
*Assistant Examiner* — William Corboy
(74) *Attorney, Agent, or Firm* — Lipsitz & McAllister, LLC

(57) ABSTRACT

In order to provide a method of operating a solar thermal power plant, in which a heat transfer medium is evaporated endothermally by solar radiation in an evaporator section, wherein the evaporator section comprises a plurality of evaporator branches, among which the heat transfer medium is distributed, in which method non-uniform radiation conditions of the evaporator section may be effectively taken into consideration, it is provided that the mass flow distribution at the evaporator section is controlled, wherein the mass flows are adjusted individually at all or a majority of the evaporator branches and a controlled variable is a variable characterizing a spatial energy rise in a respective evaporator branch in a region of the evaporator branch where the heat transfer medium has not yet evaporated.

17 Claims, 2 Drawing Sheets

(56) References Cited

U.S. PATENT DOCUMENTS

| | | | |
|---|---|---|---|
| 4,156,455 A * | 5/1979 | van der Meulen | 165/292 |
| 4,289,114 A * | 9/1981 | Zadiraka | 126/587 |
| 4,296,730 A * | 10/1981 | Zadiraka | 126/592 |
| 4,340,030 A * | 7/1982 | Molivadas | 126/635 |
| 4,355,908 A * | 10/1982 | Weisser et al. | 374/39 |
| 4,375,806 A * | 3/1983 | Nishman | 126/585 |
| 4,628,692 A * | 12/1986 | Pierce | 60/641.8 |
| 5,224,466 A * | 7/1993 | Kirchmayer | 126/714 |
| 6,047,696 A * | 4/2000 | Bohringer | 126/587 |
| 6,413,361 B1 * | 7/2002 | Hino et al. | 159/44 |
| 6,536,677 B2 * | 3/2003 | Melendez-Gonzalez | 237/2 B |
| 2008/0184789 A1 | 8/2008 | Eck et al. | |

OTHER PUBLICATIONS

English Machine Translation of JP 10103605A, Taniguchi et al, Apr. 21, 1998.*

* cited by examiner

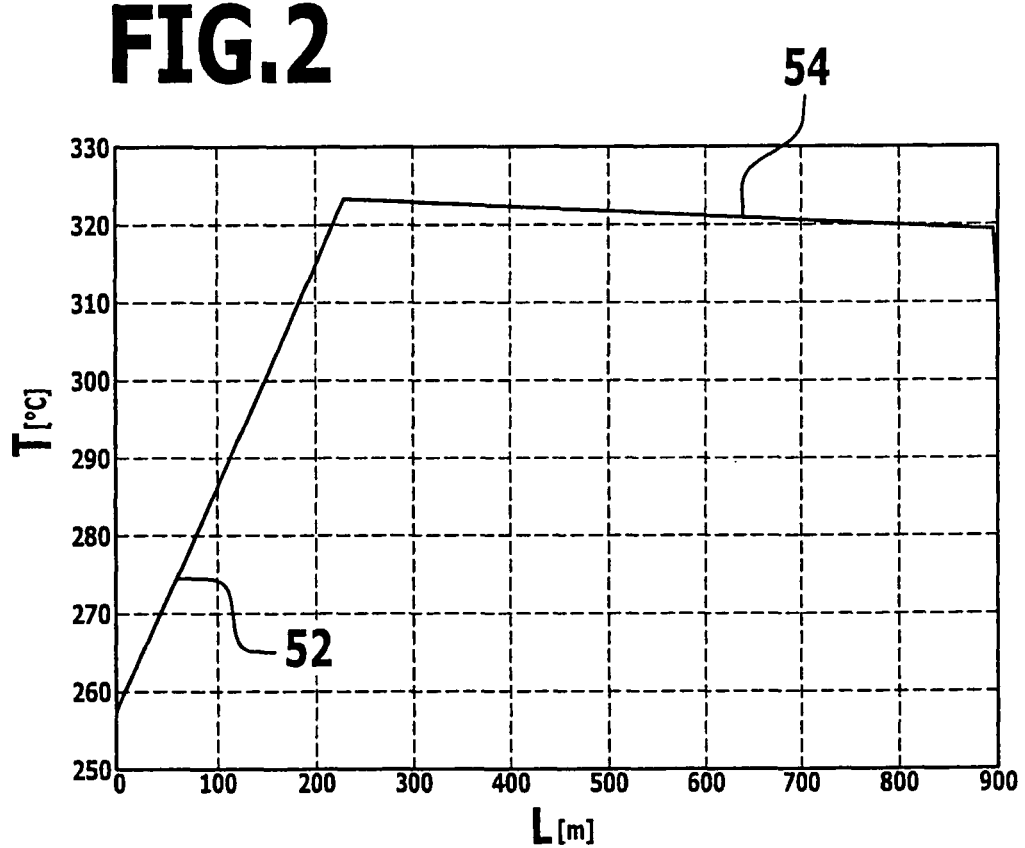

METHOD OF OPERATING A SOLAR THERMAL POWER PLANT AND SOLAR THERMAL POWER PLANT

The present disclosure relates to the subject matter disclosed in German application number 10 2007 052 234.9 of Oct. 22, 2007, which is incorporated herein by reference in its entirety and for all purposes.

BACKGROUND OF THE INVENTION

The invention relates to a method of operating a solar thermal power plant, in which a heat transfer medium is evaporated endothermally by solar radiation in an evaporator section, wherein the evaporator section comprises a plurality of evaporator branches, among which the heat transfer medium is distributed.

The invention further relates to a solar thermal power plant, comprising an evaporator section having a plurality of evaporator branches, in which heat transfer medium is evaporable endothermally by solar radiation.

In solar thermal power plants a heat transfer medium is heated by solar radiation. The thermal energy of the heat transfer medium is converted (partially) into mechanical energy in one or more turbines. At one or more generators the mechanical energy is converted into electrical energy. In this case, it is also possible for vaporous heat transfer medium to be used as process steam for example in a chemical plant.

There are solar thermal power plants, in which superheated steam is supplied to steam turbines, and solar thermal power plants that comprise gas turbines.

SUMMARY OF THE INVENTION

In accordance with the present invention, a method and a solar thermal power plant are provided, which allow non-uniform irradiation situations of the evaporator section to be effectively taken into consideration.

In accordance with an embodiment of the invention, a method is provided, wherein the mass flow distribution at the evaporator section is controlled, and wherein the mass flows are adjusted individually at all or a majority of the evaporator branches and a controlled variable is a variable characterizing a spatial energy rise at a respective evaporator branch in a region of the evaporator branch where heat transfer medium has not yet evaporated.

In accordance with the present invention, at the evaporator section the mass flow distribution among the evaporator branches is controlled. This makes it easy to control the vapour content at the sections of the evaporator branches. No sensors are needed to measure the vapour contents. Such sensors are very expensive and also entail control-related problems.

In accordance with the present invention, an actual value of the variable characterizing the spatial energy rise for the heat transfer medium at a respective evaporator branch is compared with a setpoint value. In the event of deviation, the mass flow at the respective evaporator branch is adjusted in such a way that the actual value approaches the setpoint value.

An evaporator section of a solar thermal power plant extends over a large surface area. A plurality of evaporator branches are provided, wherein the evaporator branches in turn usually comprise a plurality of solar collectors or absorbers. An evaporator branch may for example have a length in the order of magnitude of 1000 m. 50 or more evaporator branches may be provided. In the evaporator section non-uniform irradiation conditions may therefore exist, as well as different hydraulic conditions. This may lead for example to vaporous heat transfer medium being generated and superheated in one evaporator branch, while in another evaporator branch there is no evaporation at all. By virtue of the solution according to the invention such different conditions may easily be taken into consideration and by virtue of an adapted distribution of the heat transfer medium (through adjustment of the mass flows) these different conditions may be taken into consideration. This in turn makes it possible to optimize the generation of vaporous heat transfer medium at the evaporator section.

By virtue of the solution according to the invention it is easily possible at all of the evaporator branches of the evaporator section to adjust at the respective exit the same vapour state (i.e. the same vapour content). This occurs without measuring the vapour state by taking into consideration the spatial rise of the variable characterizing the energy rise at the heat transfer medium, in particular at the start region of an evaporator branch. For example, a spatial temperature rise in the start region of an evaporator branch may be interpreted as an enthalpy rise and extrapolated over the entire length of an evaporator branch; in this way, the outlet enthalpy and/or the outlet vapour content is approximately obtained.

In the solution according to the invention, the aim of control is to adjust the state at the outlet of an evaporator branch as uniformly as possible in all evaporator branches and to prevent drying-out at individual evaporator branches.

The vapour content at the outlet of an evaporator branch, the irradiation state of an evaporator branch, and the mass flow at an evaporator branch need not be measured to adjust the vapour state at the respective outlet of the evaporator branches.

In principle, it is possible for the mass flows at all of the evaporator branches of the evaporator section to be adjusted individually. Alternatively it is possible for the mass flows to be adjusted, not at all of the evaporator branches, but only at a majority of the evaporator branches. The "remaining" evaporator branch(es), at which no intervention occurs, may then serve as a reference branch and/or reference branches for other evaporator branches.

The energy absorption of the heat transfer medium in an evaporator branch may be determined for example by determining a spatial temperature rise in a preheating section of an evaporator branch. Also, from the spatial variation of other variables such as for example the density or the specific thermal capacity or the specific enthalpy of the heat transfer medium it is possible to determine the energy absorption and hence the spatial energy rise. From the determination of a branch wall temperature it is also possible to draw conclusions about the spatial energy rise.

It is possible for the evaporator section to take the form of a collector array comprising a plurality of focal-line collectors. In such a focal-line collector, an absorber is disposed in a focal region of a solar radiation collector. It is also possible for the evaporator section to be realized for example on a tower receiver of a tower power plant, wherein the heat transfer medium flows in an absorber. Solar radiation is directed for example by means of heliostats towards this absorber in order to heat the heat transfer medium.

In particular, a setpoint value of the controlled variable is identical for all of the evaporator branches or for a majority of the evaporator branches of the evaporator section. This means that the setpoint value for all of the evaporator branches or at least for a majority of the evaporator branches of the evaporator section is the same. It is therefore easy to obtain a homogenization of the direct evaporation of the liquid heat transfer medium at the evaporator section, even when there are for example spatially non-uniform irradiation conditions.

It is advantageous if an actual value of the controlled variable is determined at an evaporator branch over a length of at most 200 m and in particular at most 150 m of the evaporator branch from an inlet of the evaporator branch (in relation to a distribution line). It is thereby possible to guarantee that the energy rise is determined in a region where the heat transfer medium has not yet evaporated. In particular, the temperature is determined in a region of an evaporator branch where the liquid heat transfer medium is still liquid and sensitively absorbing heat.

It is further advantageous if an actual value of the controlled variable is determined at an evaporator branch at one or more—in relation to an inlet of the evaporator branch—front solar collectors or front absorbers of the evaporator branch. It is thereby guaranteed that the determination is measured in a region where the heat transfer medium is still liquid.

In an advantageous embodiment, an actual value of the controlled variable is determined at a first solar collector or first absorber of an evaporator branch. The first solar collector or first absorber of the evaporator branch is the one nearest the distribution line, through which liquid heat transfer medium is injected into the evaporator branch. It is thereby possible to ensure that the spatial energy rise of liquid heat transfer medium is determined.

In particular, an actual value of the controlled variable is determined between an inlet and an outlet of the first solar collector or first absorber. In this way, the spatial energy rise may easily be determined.

The spatial temperature rise is an example of a variable, by means of which the energy absorption in an evaporator branch may easily be determined.

It is quite particularly advantageous if the controlled variable is a spatial temperature rise and an actual value of the spatial temperature rise is determined at the evaporator branches or a majority of the evaporator branches from temperature measured values of the heat transfer medium. The temperature is easy to measure and the spatial temperature rise may therefore be easily approximately determined and/or estimated. This in turn makes it easy to carry out the control method according to the invention.

In particular, for the heat transfer medium temperature measured values of the heat transfer medium are determined at at least two spaced-apart points. It is therefore easily possible to determine the spatial temperature rise as an actual value for adjustment to a setpoint value.

There is advantageously associated with an evaporator branch a mass flow adjustment device, by means of which the mass flow at the evaporator branch is adjustable. By controlling the mass flow an adjustment of the actual value of the controlled variable to a setpoint value may be achieved. This in turn makes it possible to take into consideration non-uniform irradiation conditions as well as non-uniform hydraulic conditions in relation to the outlet parameters of the respective evaporator branch. Non-uniform hydraulic conditions may be caused for example by different lengths and shapes of feed lines, different built-in components, etc.

The mass flow at an evaporator branch is advantageously adjusted in such a way that an actual value of the controlled variable at the evaporator branch is adjusted to a setpoint value of the controlled variable. It is therefore easily possible to control the evaporator section.

In particular, the evaporator branches at the evaporator section are arranged parallel. This makes it easy to distribute heat transfer medium. A flow through a large effective surface area is therefore achievable in order in turn to enable an effective absorption of heat by solar radiation.

In one embodiment, heat transfer medium is conveyed from the evaporator branches into one or more liquid-vapour separators. At this or these, heat transfer medium that is still liquid may be separated from vaporous heat transfer medium. The liquid heat transfer medium may be fed back (recirculated) to the evaporator branches. The vaporous heat transfer medium may be fed for example to a superheater section.

It is advantageous if liquid heat transfer medium is recirculated. The effect thereby achieved, in the case of solar direct evaporation, is a stabilizing of the process.

In an alternative embodiment, heat transfer medium is conveyed from the evaporator section directly into a superheater section. This throughflow is not interrupted by a separator.

It is advantageous if evaporated heat transfer medium is fed to a superheater section, in which it is superheated endothermally by solar radiation. Superheated heat transfer medium may be used for example as process steam or it may drive one or more steam turbines.

In particular, an evaporator branch comprises one or more solar collectors and/or one or more absorber devices. The solar collectors are in particular focal-line collectors such as trough collectors or Fresnel collectors. At a solar collector solar radiation is concentrated onto an absorber, which is disposed in particular focally relative to a collector part of the solar collector. An absorber device may be disposed for example on a tower receiver, towards which solar radiation is directed in a concentrated manner by means of heliostats. In the last-mentioned embodiment, the evaporator section is disposed with its evaporator branches on a tower receiver.

In the solar thermal power plant in accordance with the invention, mass flow adjustment devices are provided, which are associated in each case with evaporator branches, temperature measuring devices are provided, which are associated in each case with evaporator branches and by means of which the temperature of the heat transfer medium at the respective evaporator branch is measurable at spaced-apart points, and a control device is provided, which controls the spatial temperature rise at the respective evaporator branches through control of the mass flow adjustment device.

The solar thermal power plant in accordance with the invention already has the advantages described in connection with the method according to the invention. The spatial temperature rise is the controlled variable.

Further advantageous developments of the solar thermal power plant according to the invention have likewise already been described in connection with the method according to the invention.

In particular, the control device controls the mass flow adjustment devices in such a way that an actual value of the spatial temperature rise in all of the evaporator branches or in a majority of the evaporator branches is adjusted to a setpoint value of the spatial temperature rise.

In a simple embodiment, the mass flow adjustment devices each comprise at least one control valve, by means of which the mass flow at an evaporator branch is adjustable.

It is advantageous if the temperature measuring devices each comprise at least one temperature sensor. It is therefore possible to determine a temperature difference. This in turn makes it possible to determine the spatial temperature rise. In this case, it is possible for at least two temperature sensors to be disposed at the respective evaporator branches. It is alternatively possible for only one temperature sensor to be disposed at an evaporator branch and for a further temperature sensor to be disposed at a distribution line, to which the evaporator branches of the evaporator section are connected. This temperature sensor at the distributor centrally measures the temperature of the supplied heat transfer medium for the evaporator section. There is then no need to measure the temperature at an inlet of the evaporator branches. If at least two temperature sensors are used to measure the temperatures at the respective evaporator branches, then different temperature losses and different throughflow times in feed lines to the respective evaporator branch may be taken into consideration and the inaccuracies resulting from such different conditions are avoided. Another possibility is for example that the temperature of the supplied heat transfer medium in a distributor to the evaporator section is not measured but assumed to be constant in time.

It is particularly advantageous if at an evaporator branch at least two temperature sensors are disposed. It is therefore possible to take into consideration for example different temperature losses and different throughflow times in feed lines to the respective evaporator branch, since the temperatures at the corresponding evaporator branch having at least two temperature sensors may be determined directly at the evaporator branch.

Advantageously, a maximum distance between the first temperature sensor and the last temperature sensor is 200 m and in particular 150 m. It is thereby guaranteed that the temperature measurement to determine the spatial temperature rise occurs outside of a region where heat transfer medium has already evaporated.

In particular, the first temperature sensor is disposed at or in the vicinity of an inlet of the respective evaporator branch. In this way, it is easy to obtain a "minimal" inlet value, on the basis of which the spatial temperature rise may be determined.

It is further advantageous if the last temperature sensor is disposed at or in the vicinity of an outlet of a first solar collector or first absorber of the respective evaporator branch. The corresponding solar collector therefore need not be modified or need be only minimally modified. It is further possible to guarantee that the spatially last temperature value is determined in a region where the heat transfer medium is still liquid and has not yet evaporated.

In particular, the temperature sensors are disposed between an inlet and an outlet of a first solar collector or first absorber of the respective evaporator branch. This makes it easy to determine a temperature difference through the first solar collector or first absorber, on the basis of which the spatial temperature rise may be determined. Temperature sensors that are in any case provided may moreover be used.

Advantageously, the evaporator branches of the evaporator section are arranged parallel. This allows a parallel distribution of heat transfer medium in the evaporator section. Heat transfer medium may therefore be conveyed in a large surface area, thereby in turn allowing effective heat absorption by means of solar radiation.

In particular, an evaporator branch comprises in each case at least one solar collector and preferably a plurality of solar collectors and/or one or more absorbers for solar radiation. It is then easily possible to generate heat transfer medium vapour.

It is possible for the evaporator branches to open out into one or more liquid-vapour separators. It is therefore possible to separate liquid heat transfer medium, which has not evaporated, from vaporous heat transfer medium. The liquid heat transfer medium may be for example recirculated and the vaporous heat transfer medium may be fed to a superheater section for solar superheating.

In an alternative embodiment, the evaporator branches open out into a superheater section. The heat transfer medium then flows through the evaporator section and enters the superheater section without having to pass through a separator.

A superheater section is advantageously provided, which is disposed in relation to a direction of flow of the heat transfer medium downstream of the evaporator section. In the superheater section vaporous heat transfer medium may be superheated. It may then be used effectively to generate power in a steam turbine.

The following description of preferred embodiments serves in combination with the drawings to provide a detailed explanation of the invention.

BRIEF DESCRIPTION OF THE DRAWINGS

FIG. 2 shows a diagrammatic representation of the characteristic of the temperature of a heat transfer medium in an evaporator branch over the length of the evaporator branch.

DETAILED DESCRIPTION OF THE INVENTION

Figure 1:
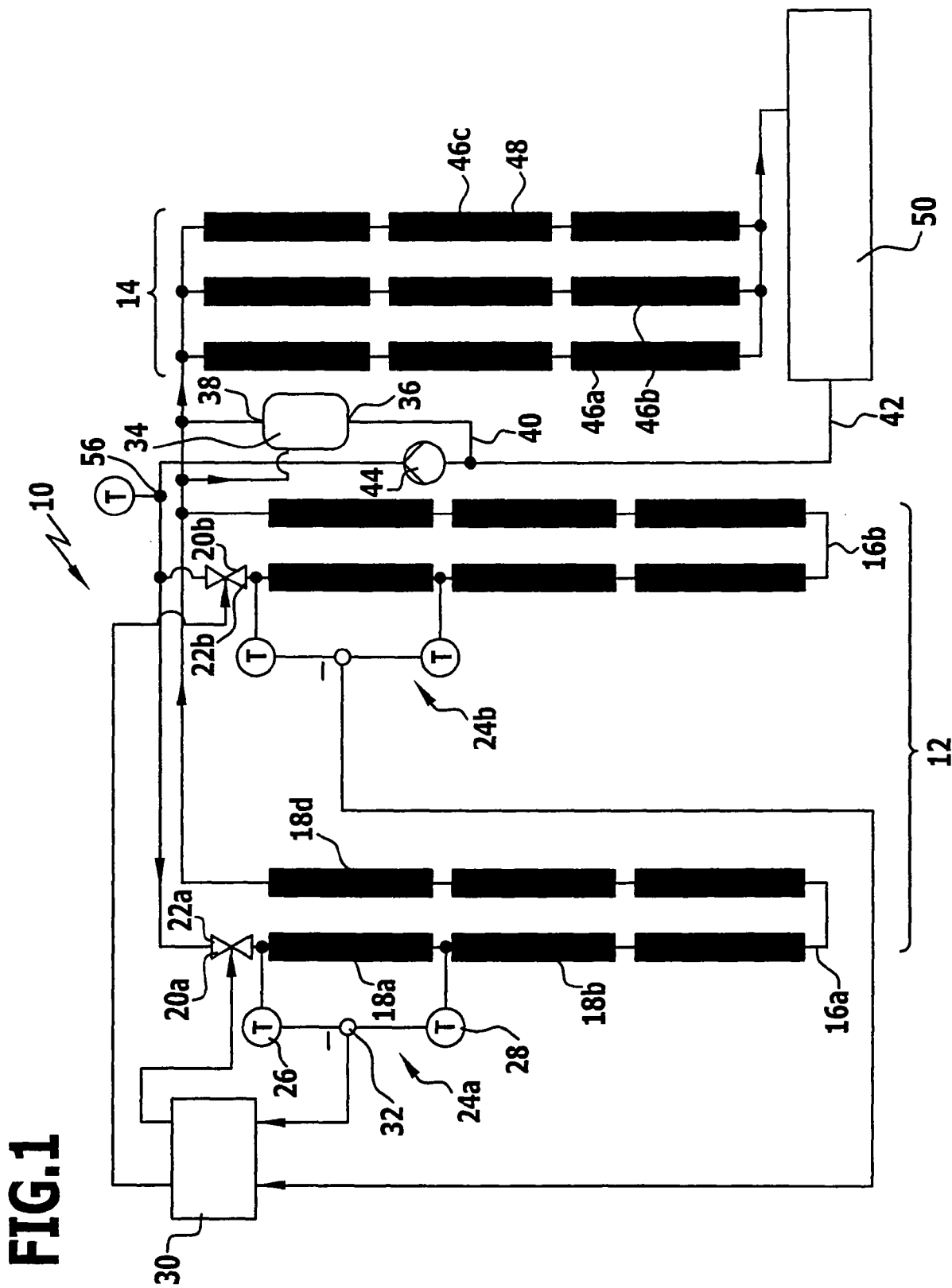
FIG. 1 shows a diagrammatic representation of an embodiment of a solar thermal power plant according to the invention.

An embodiment of a solar thermal power plant according to the invention, which is shown diagrammatically in FIG. 1 and denoted there by 10, comprises an evaporator section 12 and a superheater section 14. In the evaporator section 12 liquid heat transfer medium, such as for example water, is evaporated by heat absorption from solar radiation. In the superheater section 14 the vaporous heat transfer medium coming from the evaporator section 12 is superheated.

The evaporator section 12 comprises a plurality of evaporator branches 16a, 16b etc. The evaporator branches 16a, 16b are arranged parallel; there is a parallel distribution of heat transfer medium among them.

An evaporator branch 16a, 16b in turn comprises a plurality of solar collectors 18a, 18b, . . . , 18d, which are disposed in succession (connected in series). Heat transfer medium flowing through an evaporator branch 16a, 16b has to flow through all of the solar collectors 18a, 18b, . . . , 18d of the evaporator branch 16a, 16b. The evaporator branch 16a, 16b in this case has a first solar collector 18a and a last solar collector 18d. The first solar collector 18a is adjacent to an inlet of the evaporator branch 16a, 16b (for heat transfer medium) and the last solar collector 18d is adjacent to an outlet of the evaporator branch 16a, 16b (for heat transfer medium).

The solar collectors 18a etc. of an evaporator branch 16a, 16b are in particular focal-line collectors such as trough collectors or Fresnel collectors.

At the solar collectors 18a etc., heat transfer medium is heated up to evaporation.

In a front region of the evaporator branches 16a, 16b the absorption of sensible heat by the heat transfer medium occurs, with a simultaneous rise in temperature. The evaporation occurs, not immediately after entry into the respective evaporator branch 16a, 16b, but only after a specific length range. For example, the evaporation occurs only after flowing through the first solar collector 18a of the respective evaporator branch 16a, 16b.

Associated with each evaporator branch 16a, 16b is a mass flow adjustment device 20a, 20b. This comprises in particular in each case one (or more) control valves 22a, 22b. By means of a defined adjustment of the respective control valves 22a, 22b the mass flow, which flows through the associated evaporator branch 16a, 16b, is adjusted in a defined manner.

Associated with each evaporator branch 16a, 16b is a respective temperature measuring device 24a, 24b. This comprises in each case a first temperature sensor 26 and (at least) a second temperature sensor 28. The first temperature sensor 26 is disposed upstream of an inlet of the first solar collector 18a in the immediate vicinity of this inlet, and the second temperature sensor is disposed at an outlet of the first solar collector 18a and an inlet of the next solar collector 18b. By means of the temperature sensors 26 and 28 the temperature rise at the first solar collector 18a may be determined.

The solar thermal power plant 10 comprises a control device 30. This is connected in a signal-effective manner to the mass flow adjustment devices 20a, 20b. The control device 30 supplies signals to the control valves 22a, 22b for the individual control thereof. As a result, the mass flows that flow through the respective evaporator branches 16a, 16b are individually adjustable.

The control device 30 is further connected in a signal-effective manner to the temperature measuring devices 24a, 24b. These supply their measurement signals to the control device 30, which on the basis of these measured values controls the mass flow adjustment devices 20a, 20b in the manner to be explained in more detail below.

In this case, it is possible for the control device to receive the measured values of the temperature sensors 26 and 28 in an "unfiltered" form. It is however also possible for a pre-evaluation to have already been carried out in that for example in a differentiator 32 the temperature difference of the measured temperatures is calculated and only this difference signal is supplied to the control device 30.

The evaporator branches 16a, 16b open out into a liquid-vapour separator 34. In this, liquid heat transfer medium may be separated from vaporous heat transfer medium. The liquid-vapour separator 34 has a first outlet 36 for liquid and a second outlet 38 for vaporous heat transfer medium.

Connected to the first outlet 36 is a line 40. This line 40 opens out into a line 42, to which in turn the evaporator branches 16a, 16b are connected by the respective mass flow adjustment devices 20a, 20b. The line 42 is a supply line for liquid heat transfer medium, which may be distributed among the evaporator branches 16a, 16b by the line 42; it is a distributor of heat transfer medium to the evaporator branches 16a, 16b.

Disposed at the line 42 is a pump 44 for delivering the liquid heat transfer medium.

By injecting liquid heat transfer medium, which is provided by the liquid-vapour separator 34, into the line 40, liquid heat transfer medium may be recirculated in the evaporator section 12. The recirculated heat transfer medium in this case is already heated as a result of flowing through the evaporator section 12.

The superheater section 14 is connected to the second outlet 38 of the liquid-vapour separator 34. It supplies the superheater section 14 with vaporous heat transfer medium, which is superheated in the superheater section 14.

The superheater section comprises a plurality of super heater sections 46a, 46b, 46c. The superheater sections 46a, 46b, 46c are disposed parallel to one another. Vaporous heat transfer medium that is supplied by the liquid-vapour separator 34 may be distributed among the superheater sections 46a, 46b, 46c.

For example, the superheater sections 46a, 46b, 46c each comprise a plurality of solar collectors 48, such as for example focal-line collectors, for superheating the vaporous heat transfer medium. It is in principle also possible for the superheater sections to be realized for example on a tower receiver.

The superheater section 14 may be designed as described in the non-prior publication German patent application No. 10 2007 005 562.7 of Jan. 24, 2007 of the same applicant or in the U.S. application with Ser. No. 12/011,033 of Jan. 23, 2008.

Disposed downstream of the superheater section 14 is a generator device 50. This comprises for example one or more steam turbines, at which through expansion of the generated vaporous heat transfer medium it is possible to generate rotational energy, which may in turn be converted by a power generator into electrical energy.

Liquid heat transfer medium thus produced is carried away through the line 42.

The superheater section 14 provides superheated vaporous heat transfer medium, wherein this vaporous heat transfer medium was generated endothermally by solar radiation. For specific applications, this superheated heat transfer medium may also be used directly as process steam. In this case, the generator device 50 is replaced by the appropriate application.

The method according to the invention operates as follows.

Liquid heat transfer medium is supplied through the line 42 to the evaporator section 12. There, it is distributed among the evaporator branches 16a, 16b etc. In the respective evaporator branches 16a, 16b it is heated and evaporated. In the liquid-vapour separator 34 non-evaporated heat transfer medium is separated from the vaporous heat transfer medium and recirculated into the line 42.

The evaporator section 12 is formed by an array of solar collectors 18a etc. of the evaporator branches 16a, 16b etc. It takes up a relatively large spatial area. The irradiation conditions at different evaporator branches 16a, 16b may differ.

In order to obtain a high stability of steam generation, an adjustment of the mass flows with regard to the vapour content is required at the evaporator branches 16a, 16b. In principle, corresponding vapour content sensors may be provided for this purpose. These however have control-related drawbacks and are also very cost-intensive.

In the solution according to the invention, the controlled variable for the evaporator section 12 is a setpoint value of the spatial temperature rise of the heat transfer medium at the evaporator branches 16a, 16b.

FIG. 2 diagrammatically shows a typical temperature characteristic at an evaporator branch over the length L. There is a first region 52, in which the temperature rises. In a second region 54 the temperature slowly drops. In the second region 54 the evaporation of the heat transfer medium occurs. In the first region 52 an absorption of sensible heat occurs.

In the illustrated example, the inlet temperature in the corresponding evaporator branch is 260° C. and the evaporator branch has a total length of 900 m. The evaporation sets in at a length L of ca. 230 m. The solar collectors 18a etc. of an evaporator branch 16a in this case have a length of ca. 100 m to 150 m.

The temperature rise in the first region 52 is at least approximately linear.

In the solution according to the invention, the first temperature sensor 26 and the second temperature sensor 28 (and optionally further temperature sensors) are disposed in the first region 52. They therefore detect the temperature of the heat transfer medium in a heating area where the heat transfer medium is not yet vaporous.

In particular, the second temperature sensor 28 is disposed below L=200 m.

In the advantageous embodiment described above, the second temperature sensor 28 is disposed between the first solar collector 18a and the following, second solar collector 18b, i.e. the temperature sensors 26 and 28 are disposed between an inlet and an outlet of the first solar collector 18a.

The temperature sensors 26, 28 supply temperature measured values, which may be used to determine at least approximately the temperature characteristic in the first region 52. From them, an actual value of the spatial temperature rise in the respective evaporator branches 16a, 16b etc., may be determined. The controlled variable is a setpoint value of the spatial temperature rise, wherein this setpoint value is defined identically for all of the evaporator branches 16a, 16b etc., or at least for a majority of these evaporator branches.

The actual values are supplied to the control device 30. This then individually adjusts the mass flow for the associated evaporator branches 16a, 16b etc. by means of the mass flow devices 20a, 20b etc., namely in a control circuit such that there is an adjustment to the setpoint value of the spatial temperature rise.

Different spatial irradiation conditions at the evaporator section 12 may therefore be easily taken into consideration and an effective evaporation of the liquid heat transfer medium at the evaporator section 12 is achieved.

In addition to non-uniform radiation situations at the evaporation section 12, it is moreover possible to take non-symmetrical hydraulic conditions into consideration and compensate them. By virtue of the method according to the invention an adapted mass flow distribution at the evaporator section 12 among the individual evaporator branches 16a, 16b etc. is achievable, wherein an individual mass flow adaptation at individual evaporator branches 16a, 16b is possible.

The supplied vapour is then superheated in the superheater section 14. The superheated vapour may then be used in the generator device 50 or as process vapour. At the superheater section with its superheating branches a mass flow adjustment may be used with the aid of the method described in the non-prior publication German patent application No. 10 2007 005 562.7 of Jan. 24, 2007 of the same applicant or in U.S. Ser. No. 12/011,033.

In an alternative embodiment, the vaporous heat transfer medium is conveyed from the evaporator section directly into the superheater section without passing through a separator.

It is possible for the evaporation (and optionally also the superheating) of the heat transfer medium to be effected, not in focal-line collectors, but at an absorber, towards which solar radiation is directed for example by means of heliostats. In such a case, the evaporator section is disposed in particular on a tower receiver.

It is further possible that for example at an evaporator branch only one temperature sensor corresponding to the temperature sensor 28 is disposed. A further temperature sensor 56 is disposed at the line 42 acting as a feed line and distribution line for the evaporator branches 16a, 16b. The spatial temperature rise is then determined by means of the temperature of the heat transfer medium upstream of the inlet into the evaporator branches 16a, 16b and by means of the temperature downstream of the first solar collector 18a etc.

If the temperature in the line 42 feeding the heat transfer medium to the evaporator branches 16a, 16b is known and assumed to be constant, then the spatial temperature rise may be determined also by merely measuring the temperature values of the corresponding temperature sensors 28.

In the solution according to the invention, the energy absorption in an evaporator branch is determined by determining the spatial temperature rise in a preheating section 52 (in a region where no evaporation has yet occurred). In principle, the energy absorption may be determined also from other variables of spatial variation, such as for example the density, the specific thermal capacity, the specific enthalpy or the branch wall temperature.

The invention claimed is:

1. Method of operating a solar thermal power plant, comprising:
    evaporating a liquid heat transfer medium endothermally by solar radiation in an evaporator section, said evaporator section comprising a plurality of evaporator branches, among which the heat transfer medium is distributed;
    controlling a mass flow distribution at the evaporator section; and
    adjusting the mass flows individually at all or a majority of the evaporator branches using a corresponding controlled variable for each of the respective evaporator branches to be controlled such that a vapor content at respective exits of all or a majority of the evaporator branches is identical,
    wherein:
    the corresponding controlled variable is a variable characterizing a spatial energy rise in the respective evaporator branch in a region of the respective evaporator branch where the liquid heat transfer medium has not yet evaporated; and
    the vapor content at the respective exits of the evaporator branches is controlled without directly measuring the vapor content.

2. Method according to claim 1, wherein a setpoint value of each of the controlled variables is identical for all of the evaporator branches or for a majority of the evaporator branches of the evaporator section.

3. Method according to claim 1, wherein an actual value of the corresponding controlled variable is determined at the respective evaporator branch over a length of at most 200 m of the respective evaporator branch from an inlet of the respective evaporator branch.

4. Method according to claim 1, wherein an actual value of the corresponding controlled variable is determined at the respective evaporator branch at one or more, in relation to an inlet of the respective evaporator branch, front solar collectors or absorbers of the respective evaporator branch.

5. Method according to claim 1, wherein an actual value of the corresponding controlled variable is determined at a first solar collector or first absorber of the respective evaporator branch.

6. Method according to claim 5, wherein the actual value of the corresponding controlled variable is determined between an inlet and an outlet of the first solar collector or of the first absorber.

7. Method according to claim 1, wherein the corresponding controlled variable is a spatial temperature rise.

8. Method according to claim 7, wherein an actual value of the spatial temperature rise is determined at the respective evaporator branch or a majority of the evaporator branches from temperature measured values of the heat transfer medium.

9. Method according to claim 8, wherein temperature measured values of the heat transfer medium are determined at at least two spaced-apart points.

10. Method according to claim 1, wherein associated with each of the evaporator branches is a mass flow adjustment device, by means of which the mass flows at the respective evaporator branches are adjustable.

11. Method according to claim 1, wherein the mass flow is adjusted at the respective evaporator branch such that an actual value of the corresponding controlled variable at the respective evaporator branch is adjusted to a setpoint value of the corresponding controlled variable.

12. Method according to claim 1, wherein the evaporator branches of the evaporator section are arranged parallel.

13. Method according to claim 12, wherein the heat transfer medium is conveyed from the evaporator branches into one or more liquid-vapour separators.

14. Method according to claim 13, wherein:
the liquid heat transfer medium is recirculated.

15. Method according to claim 1, wherein the heat transfer medium is conveyed through the evaporator section directly into a superheater section.

16. Method according to claim 1, wherein:
the heat transfer medium once evaporated comprises a vaporous heat transfer medium; and
the vaporous heat transfer medium is fed to a superheater section, in which it is superheated endothermally by solar radiation.

17. Method according to claim 1, wherein each of the evaporator branches comprises at least one of one or more solar collectors and one or more absorber devices for solar radiation.

\* \* \* \* \*